United States Patent [19]

Udagawa

[11] Patent Number: 5,096,325
[45] Date of Patent: Mar. 17, 1992

[54] POSITIONING PIN FOR A GASKET

[75] Inventor: Tsunekazu Udagawa, Ichikawa, Japan

[73] Assignee: Ishikawa Gasket Co., Ltd., Tokyo, Japan

[21] Appl. No.: 645,978

[22] Filed: Jan. 24, 1991

[51] Int. Cl.$^5$ .................................................. B25G 3/00
[52] U.S. Cl. ........................................ 403/13; 403/288; 277/235 B
[58] Field of Search ............................ 403/13, 14, 288; 277/235 B, 189, 11, 166

[56] References Cited

U.S. PATENT DOCUMENTS

| Re. 24,065 | 10/1955 | Bergstrom | 277/11 X |
| 2,439,306 | 4/1948 | Laidley | 277/189 |
| 4,524,979 | 6/1985 | Bauder | 277/189 |
| 4,776,601 | 10/1988 | Yamada | 277/235 B X |

Primary Examiner—Andrew V. Kundrat
Attorney, Agent, or Firm—Kanesaka and Takeuchi

[57] ABSTRACT

A positioning pin of the invention is attached to an engine part for installing a gasket thereon. The positioning pin includes a body, and at least one groove around an upper portion of the body. When the gasket is accidentally moved on the engine part or slips out of the positioning pin, the gasket engages the groove to prevent accidental disengagement of the gasket from the engine part.

9 Claims, 1 Drawing Sheet

POSITIONING PIN FOR A GASKET

BACKGROUND OF THE INVENTION AND RELATED ART STATEMENT

The present invention relates to a positioning pin or dowel attached to an engine block of an internal combustion engine for setting a location of a gasket.

When engine parts are assembled with a gasket, a lower engine part is placed on a floor or a platform. Since the lower engine part is provided with dowels for setting a location of the gasket, the gasket is placed on the lower engine part so that the dowels are located in dowel holes of the gasket. Then, an upper engine part is placed above the gasket, and the two engine parts are tightened together by bolts.

In order to easily assemble the gasket on the lower engine part, the diameter or size of the dowel hole of the gasket is slightly larger than the diameter of the dowel. Therefore, in case the lower engine part with the gasket is shaken, the gasket may disengage from the lower engine part.

Especially, in a V engine, gasket attaching surfaces of the lower engine part incline downwardly. Therefore, even if gaskets are installed on the gasket attaching surfaces of the lower engine part, the gaskets are liable to disengage from the lower engine part.

In an automatic assembly line of engines, engines are continuously or consecutively moved. When the upper engine part is assembled on the lower engine part with the gasket, in some cases, the engine parts are stopped for a while for assembly.

In the V engine, in case the lower engine part with the gasket is consecutively moved and stopped, the gasket may fall from the lower engine part. In the automatic assembly line, it is troublesome to check the gasket in each engine, and install a gasket in case no gasket is placed on the lower engine part.

In a positioning pin or dowel, there has not been made any device for preventing a gasket from disengaging from an engine part.

Accordingly, one object of the invention is to provide a positioning pin for preventing accidental disengagement of a gasket from an engine part as well as exactly setting a location of the gasket.

Another object of the invention is to provide a positioning pin as stated above, to which a gasket can be easily installed.

A further object of the invention is to provide a positioning pin as stated above, which can be easily and economically manufactured.

Further objects and advantages of the invention will be apparent from the following description of the invention.

SUMMARY OF THE INVENTION

A positioning pin or, dowel of the present invention is attached to an engine part, i.e. engine block, of an internal combustion engine for setting a location of a gasket. Generally, at least two positioning pins are attached to the engine part.

The positioning pin of the invention includes a body having an upper portion extending outwardly from the engine part when installed on the engine part, and at least one groove formed around the upper portion of the body.

When a gasket is installed on the engine part, the positioning holes of the gasket engage the positioning pins on the engine part. When the gasket thus installed abuts against the engine part, the gasket is located in a proper position. When the gasket is accidentally moved outwardly, edges of the gasket around the positioning holes engage the grooves of the positioning pins to prevent accidental disengagement of the gasket from the engine part.

Especially, in a V type engine, the gasket attaching portion of the engine inclines downwardly. Therefore, when the gasket is slightly moved, the gasket is liable to disengage from the positioning pins. In the present invention, the edges around the positioning holes of the gasket engage the grooves of the positioning pins when the gasket is moved on the position pins. Therefore, the gasket is securely retained on the engine part.

The body of the positioning pin of the invention may further include a middle portion under the groove and above the upper surface of the engine part. When the positioning holes of the gasket are situated around the middle portions of the positioning pins, the gasket is properly positioned on the engine part.

The width of the groove at an outer portion thereof may be wider than a plate for constituting a gasket. The groove may be formed in a spiral form.

The groove may be formed to include a horizontal upper wall extending inwardly from the outer surface of the body, and a tapered side wall extending downwardly from an inner edge of the the horizontal upper wall to the outer surface of the body. In this shape, the edge of the gasket around the positioning hole can securely engage the positioning pin.

Since a steel laminate gasket is formed of a plurality of thin steel plates, the positioning pin of the present invention is especially useful for retaining the steel laminate gasket on the engine part.

DETAILED DESCRIPTION OF PREFERRED EMBODIMENTS

Figure 1:
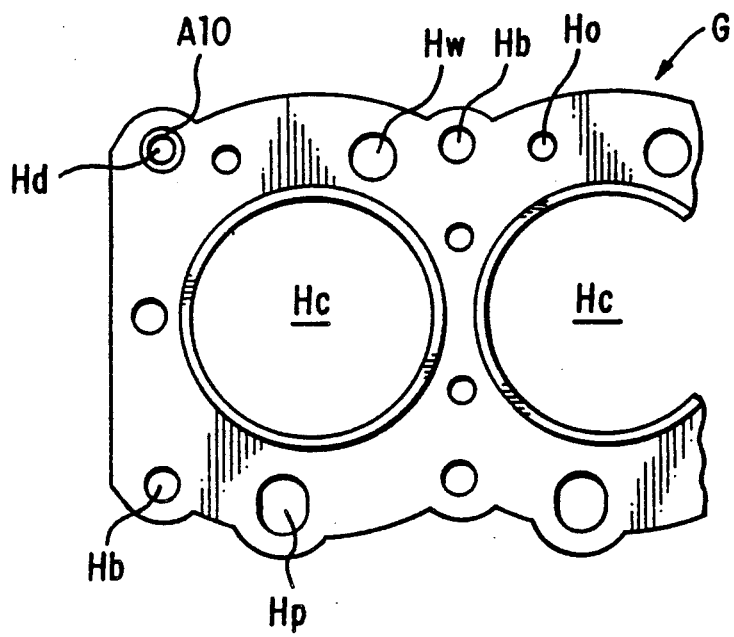
FIG. 1 is a plan view of a part of a gasket installed on a cylinder block.

FIG. 1 shows a steel laminate gasket G installed on a cylinder block X with positioning pins A or dowels of the present invention. The gasket G is a cylinder head gasket, and includes a plurality of cylinder bores Hc, water holes Hw, oil holes Ho, bolt holes Hb and push rod holes Hp, as in the conventional gasket.

The gasket G includes two positioning holes Hd (one is shown in FIG. 1). When the gasket G is installed on the cylinder block X, the positioning pins A attached to the cylinder block X are located in the positioning holes Hd of the gasket G:

In the gasket G, one of the bolt holes Hb is made large to constitute the positioning hole Hd, in which the positioning pin A is located when the gasket G is installed on the cylinder block X. When an engine is assembled, a bolt (not shown) passes through the positioning pin A and connects a cylinder head (not shown) and the cylinder block X.

Figure 2:
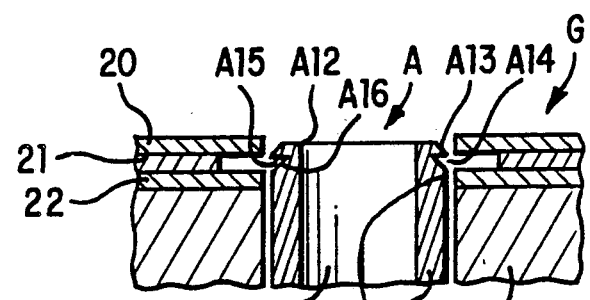
FIG. 2 is an enlarged section view taken along line 2—2 in FIG. 1, wherein a first embodiment of a positioning pin of the invention is shown.
Figure 3:
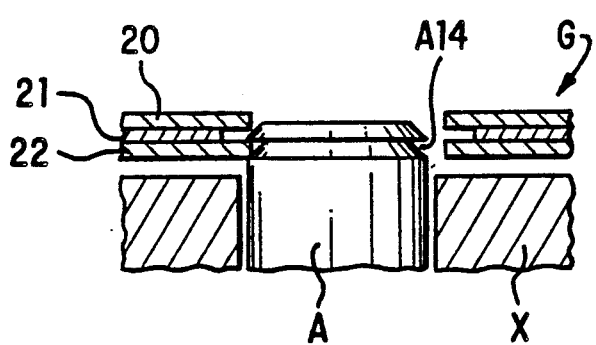
FIG. 3 is a section view similar to FIG. 2 for showing a condition that a gasket engages the positioning pin.

As shown in FIGS. 1—3, the positioning pin A has a cylindrical hollow shape and includes a hole A10 therein for allowing a bolt to pass therethrough. The positioning pin A is formed of a lower part A11 and an upper part A12.

When the positioning pin A is installed on the cylinder block X, the lower part A11 is attached to or fixed inside the cylinder block X, and the upper part A12 projects outwardly from an upper surface of the cylinder block X.

The upper part A12 includes a tapered edge A13, a groove A14 formed of an upper horizontal wall A15 and an inclined wall A16, and a cylindrical middle portion A17. The cylindrical middle portion A17 is located under the groove A14 above the lower part A11, i.e. above an upper surface of the cylinder block X.

The tapered edge A13 is formed at an upper end of the positioning pin A, so that the positioning hole of the gasket can be easily placed over the positioning pin A. Since the positioning pin A includes the horizontal wall A15 and inclined wall A16, the gasket G can easily pass over the groove A14 but is prevented from disengagement from the positioning pin A.

The cylindrical middle portion A17 has a diameter substantially the same as a positioning portion or hole of the gasket G. Therefore, when the gasket G engages the cylindrical middle portion A17, the gasket G is properly positioned on the cylinder block X.

In the embodiment as shown in FIGS. 1-3, the gasket G is a steel laminate gasket including an upper plate 20, a middle plate 21 and a lower plate 22. The size of a hole in the lower plate 22 is substantially the same as the middle portion A17 of the positioning pin A. Therefore, when the hole of the lower plate 22 engages the middle portion A17 of the positioning pin A, the gasket G is located in a proper position.

Also, the width of the groove A14 is made larger than the thicknesses of the middle and lower plates 21, 22. Accordingly, when the gasket G slips out of the positioning pin A, one of the plates 21, 22, in particular the lower plate 22 in FIGS. 2 and 3, engages the groove A14.

In FIG. 3, it is shown that the positioning pin A engages the gasket G to prevent disengagement of the gasket. In particular, when the cylinder block X with the gasket G as shown in FIG. 2 is transferred on an assembly line and is stopped, the gasket G may jump up from the cylinder block X. At this time, since the positioning pin A is provided with the groove A14, the lower plate 23 of the gasket G engages the groove A14. Accordingly, the lower plate 23 enters into the groove A14 to thereby prevent disengagement of the gasket G from the positioning pin A.

Figure 4:
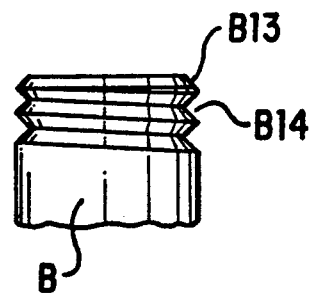
FIG. 4 is a side view of a part of a second embodiment of a positioning pin of the invention.

FIG. 4 shows a second embodiment B of a positioning pin of the invention. The positioning pin B includes a tapered edge B13 at an upper end of the positioning pin B, and a spiral groove B14. A bottom of the spiral groove B14 is located in the middle between the threads. The distance between the threads is larger than the thickness of the plates of the gasket. Accordingly, the positioning pin B can hold the gasket G when the gasket G slips out of the engine block X.

In the positioning pin of the present invention, the groove on the positioning pin has a width larger than the thickness of the plates constituting the gasket. However, if a plurality of grooves is formed around the positioning pin to provide friction with the gasket, the width of the groove need not be larger than the plates. Frictional engagement of the gasket relative to the positioning pin prevents the gasket from slipping out of the positioning pin.

In accordance with the present invention, the positioning pin attached to the engine part is provided with at least one groove at an upper portion thereof. When the gasket accidentally slips out of the positioning pin, one of the plates of the gasket engages the groove or the gasket frictionally engages the groove. Accordingly, accidental disengagement of the gasket from the engine part is securely prevented.

While the invention has been explained with reference to the specific embodiments of the invention, the explanation is illustrative, and the invention is limited only by the appended claims.

What is claimed is:

1. A positioning pin adapted to be attached to an engine part, said positioning pin being fixed to the engine part in advance for installing a gasket with a positioning hole in a predetermined position to prevent the gasket from accidentally disengaging from the engine part, said positioning pin comprising, a body adapted to be fixed to the engine part separately from the gasket and having an upper portion extending outwardly from the engine part when installed on the engine part, said upper portion having a smooth outer surface, a diameter substantially the same as the positioning hole, and an upper end, and at least one groove formed around the upper portion of the body near the upper end, said groove extending inwardly from the smooth outer surface of the upper portion so that the positioning hole of the gasket can be easily placed over the upper portion of the body and when the gasket is accidentally moved on the engine part, a portion of the gasket around the positioning hole engages the groove to prevent accidental disengagement of the gasket from the engine part.

2. A positioning pin according to claim 1, wherein said body includes a tapered edge at an upper portion thereof to facilitate engagement of the positioning hole of the gasket with the positioning pin.

3. A positioning pin according to claim 2, wherein said groove is formed below the tapered edge.

4. A positioning pin according to claim 3, wherein said body further includes a middle portion under the groove and above an upper surface of the engine part so that the gasket is properly positioned when the positioning hole of the gasket engages the middle portion.

5. A positioning pin according to claim 4, wherein width of the groove at an inlet portion is wider than a plate for constituting the gasket.

6. A positioning pin according to claim 2, wherein said groove is formed in the spiral form.

7. A positioning pin according to claim 1, wherein said groove includes a horizontal upper wall extending inwardly from an outer surface of the body, and an inclined side wall extending downwardly from an inner edge of the horizontal upper wall to the outer surface of the body.

8. A positioning pin adapted to be attached to an engine part for installing a gasket on the engine part, said gasket having a positioning hole engaging the positioning pin, said positioning pin comprising, a body attached to the engine part and having an upper portion extending outwardly from the engine part and an outer surface, and at least one groove formed around the upper portion of the body, said groove including a horizontal upper wall extending inwardly from the outer surface of the body, an inner edge of the upper wall and an inclined side wall extending downwardly from the inner edge of the horizontal upper wall to the outer surface of the body so that when the gasket is accidentally moved on the engine part, a portion of the gasket around the positioning hole engages the groove to prevent accidental disengagement of the gasket from the engine part.

9. A positioning pin according to claim 1, wherein said upper portion under the groove has a diameter substantially the same as that of the positioning hole of the gasket so that when the gasket engages the upper portion under the groove, the gasket is properly positioned on the engine part.

* * * * *